(12) United States Patent
Levchik et al.

(10) Patent No.: US 7,910,665 B2
(45) Date of Patent: *Mar. 22, 2011

(54) COMPOSITION OF EPOXY RESIN AND EPOXY-REACTIVE POLYPHOSPHONATE

(75) Inventors: Sergei Levchik, Croton-on-Hudson, NY (US); Andrew M. Piotrowski, Yorktown Heights, NY (US)

(73) Assignee: ICL-IP America Inc., Ardsley, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/557,812

(22) PCT Filed: May 19, 2004

(86) PCT No.: PCT/US2004/016459
§ 371 (c)(1),
(2), (4) Date: Apr. 2, 2007

(87) PCT Pub. No.: WO2004/113411
PCT Pub. Date: Dec. 29, 2004

(65) Prior Publication Data
US 2007/0219295 A1   Sep. 20, 2007

(51) Int. Cl.
*C08G 59/40* (2006.01)
*C08L 63/00* (2006.01)
*C08L 63/02* (2006.01)
(52) U.S. Cl. .......... 525/523; 528/219; 528/398
(58) Field of Classification Search .......... None
See application file for complete search history.

(56) References Cited

U.S. PATENT DOCUMENTS

| 4,617,584 | A  | * | 10/1986 | Ikeya et al. ............... 257/793 |
| 7,427,652 | B2 | * | 9/2008 | Levchik et al. ............ 525/486 |
| 7,449,526 | B2 | * | 11/2008 | Levchik et al. ............ 525/523 |

FOREIGN PATENT DOCUMENTS

| JP | 2001-19746 A | * | 1/2001 |
| WO | 03/029258 | | 4/2003 |
| WO | 2004/044054 | | 5/2004 |
| WO | 2004/060957 | | 7/2004 |

OTHER PUBLICATIONS

Patent Abstracts of Japan vol. 2000, No. 16, May 8, 2001 & JP 2001-019746, Jan. 23, 2001.

* cited by examiner

*Primary Examiner* — Robert Sellers
(74) *Attorney, Agent, or Firm* — Dilworth & Barrese, LLP.

(57) ABSTRACT

An epoxy resin composition comprising an epoxy resin and, as the effective curing agent, an epoxy-reactive polyphosphonate which can be of the formula (I) where "Y" is an arylene and "n" can range from about 2 to about 30.

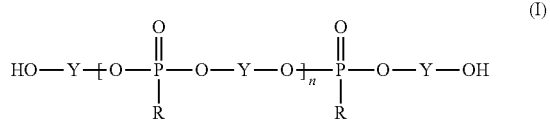

16 Claims, No Drawings

COMPOSITION OF EPOXY RESIN AND EPOXY-REACTIVE POLYPHOSPHONATE

BACKGROUND OF THE INVENTION

This invention relates to a new use for the type of polyphosphonate material that is described and claimed in U.S. Pat. Nos. 4,331,614 and 4,719,279, which are each incorporated herein by reference. While U.S. Pat. No. 4,035,442 has described polyester filaments having improved flame retardancy due to use of a poly(m-phenylene cyclohexylphosphonate), the instant invention relates to flame retarded epoxy compositions, as will be described in greater detail below. The term "polyphosphonate" as used herein is to be construed as covering oligomeric phosphonate materials as well as those of higher molecular weight.

Shouji Minegishi describes the reaction of epoxy compounds with phosphonates in Journal of Polymer Science, Part A, Polymer Chemistry, Vol. 37, 959-965:

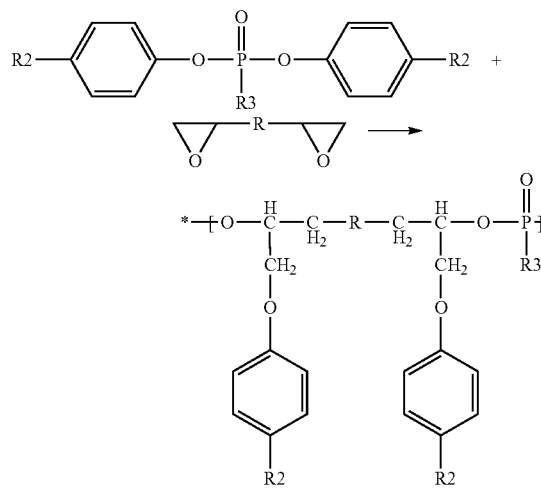

His goal was to prepare polymeric linear phosphonates with little or no residual epoxy. Such polymers can be used as additive type flame retardants.

The present invention relates to an epoxy resin composition that can be used, for example, in printed wiring boards for electronic applications. It represents a new embodiment, for example, over the type of flame retarded epoxy resin compositions described in PCT Patent Publication No. WO 03/029258 where an epoxy resin, which contained the type of polyphosphonate flame retardant additive that is also used in the epoxy resin compositions of the present invention, was cured in the presence of a methylimidazole curing catalyst.

SUMMARY OF THE INVENTION

The composition of the present invention contains, as one essential component, an epoxy resin. This component is present at from about 50% to about 95%, by weight of the total weight of the composition. This component can be a non-halogen containing epoxy resin, such as a bisphenol A-type of epoxy resin, or other resins of this general type that have utility for the manufacture of printed wiring boards or other electronic substrate materials of that type (for example, bisphenol F epoxy, phenolic novolak epoxy, cresol novolak epoxy, and/or bisphenol A novolak epoxy resins). Compatible mixtures of any of these resins may be employed, if desired.

The polyphosphonate flame retardant curing agent that forms another essential additive of the compositions of the present invention is generally present at from about 5% to about 50%, by weight of the total weight of the composition, for example, from about 10% to about 35%, by weight. In regard to epoxy compositions of the present invention, and unlike the invention described in PCT Patent Publication No. WO 03/029258, this polyphosphonate functions as the effective curing agent for the epoxy resin.

This curing agent is an polyphosphonate composition having the formula:

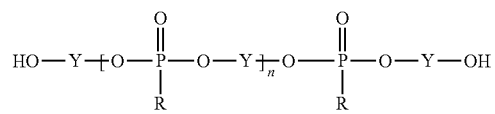

where "Y" Is an arylene and "n" can range from about 2 to about 30 and R is a lower alkyl. If desired, mixed arylenes dials and mixed alleylphosphonates can be used to prepare mixed products. This oligomeric or polymeric material has a phosphorus content of greater than about 10%, by weight. The polyphosphonate species in the composition comprise oligomers or polymers of this type that can either contain —OK end groups or not contain such end groups. The individual polyphosphonate species that contain —OH end groups can be monohydroxy or dihydroxy-substituted. The concentration of polyphosphonate species in the composition that contain hydroxy end groups can range from about 20% to about 100%, based upon the total number of termination ends ("chain ends") that potentially could hold such end groups, for example, from about 50% to about 100%. The number of OH terminal groups can be controlled by the ratio of arylene to phosphonate or by using end-capping agents such as triaryl-phosphates. In the former case, if excess aryiene-containing diol is used with the phosphonate reagent, for example, in making the polyphosphonate, there will be a higher hydroxyl content in the final product, and vice versa. The preferred R group is methyl, but can be lower alkyl.

By "Arylene" is meant any radical of a dihydric phenol. The dihydric phenol can have its two hydroxy groups in non-adjacent positions. Examples include the resorcinols; hydroquinones; and bisphenols, such as bisphenol A, bisphenol F, and 4,4'-biphenol, phenolphthalein, 4,4'-thiodiophenol, or 4,4'-sulfonyldiphenol. A small amount of polyhydric phenol, such as a novolac or phloroglucinol, with three or more hydroxyl groups therein can be included to increase the molecular weight. The Arylene group can be 1,3-phenylene, 1,4-phenylene, or a bisphenol diradical unit, but it is preferably 1,3-phenylene.

DESCRIPTION OF THE PREFERRED EMBODIMENTS

The polyphosphonate curing agent for the epoxy resin composition of this invention can be made by any of several routes: (1) the reaction of an $RPOCl_2$ with HO-Aryl-OH or a salt thereof, where R is lower alkyl, preferably methyl; (2) the reaction of diphenyl alkylphosphonate, preferably methylphosphonate, with HO-Arylene-OH under transesterification conditions; (3) the reaction of an oligomeric phosphite with repeating units of the structure —OP(OR')—O-Arylene- with an Arbuzov rearrangement catalyst, where R' is lower alkyl, preferably methyl; or (4) the reaction of an oligomeric phosphite with the repeating units having the structure —OP(O-Ph)-O-Arylene with trimethyl phosphite and an Arbuzov catalyst or with dimethyl methylphosphonate with, optionally, an Arbuzov catalyst-. The —OH end groups, if attached to Arylene can be produced by having a controlled molar excess of the HO-Arylene-OH in the reaction media. The —OH end groups, if acid type (P—OH), can be formed by hydrolytic reactions. It is preferred that the end groups of the oligomers be mainly -Arylene-OH types.

The epoxy resin composition of the present invention can contain optional additives like auxiliary flame retardant additive as well including the following types of materials: auxiliary curing catalysts, fiber and/or cloth reinforcing additives; mineral fillers, such as $Al(OH)_3$, $Mg(OH)_2$ or silica; release agents; colorants; and the like.

The present invention is further illustrated by the Examples that follow.

Example 1

The aforementioned polyphosphonate curing agent (poly (m-phenylene methylphosphonate)(29.1 g) was mixed with 70.1 g of bisphenol A type epoxy (epoxy equivalent: 180) to prepare a master batch. A 10 g sample was removed from the master batch and was placed in a nitrogen-purged oven at 179° C. A sample was removed after ninety minutes and was cooled to room temperature. The Barkol hardness was than measured using G1 934-1 meter. The sample was uniformly cured with a hardness of 28-29. The sample was submerged in acetone for twelve hours. No swelling or dissolution was observed.

Comparative Example 2

A 10 g sample of bisphenol A type epoxy (epoxy equivalent: 180) was placed the nitrogen-purged oven at 179° C. for one hundred minutes. Sample did not cure or gel. It was a viscous liquid at room temperature and was completely soluble in acetone.

Comparative Example 3

An oligomeric aliphatic phosphonate of the formula

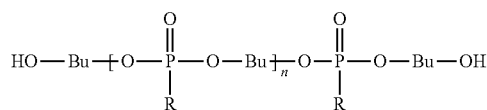

where "Bu" is $C_4H_8$, was combined with a bisphenol A di-epoxy resin (epoxy equivalent of 180) to prepare a mixture containing 70-wt % epoxy resin. The mixture was placed in an oven at 150° C. and was heated for one and one half hours. No curing occurred. The resulting product was a viscous liquid at room temperature.

Comparative Example 4

A polyphosphate, poly(ethyl ethyleneoxy)phosphate), FYROL PNX brand from Akzo Nobel, was mixed with a bisphenol A di-epoxy resin (epoxy equivalent of 180) to form a mixture containing 70% of epoxy resin and 30% of FYROL PNX. Mixture was placed in the oven at 150° C. for one and one half hours. It did not cure.

Comparative Example 5

A polyphosphonate, which is the reaction product of dimethyl methylphosphonate, $P_2O_5$ and ethylene oxide (FYROL HP brand from Akzo Nobel) with a hydroxyl number of 125 mg KOH/g was mixed with a bisphenol A di-epoxy resin (epoxy equivalent 180) to form a mixture containing 70% of epoxy resin and 30% of the polyphosphonate. The mixture was placed in an oven at 150° C. for one and one half hours. It did not cure.

Example 6

A 30% by weight mixture of diphenyl methylphosphonate and a bisphenol A di-epoxy resin (epoxy equivalent 180) was heated at 150° C. for one and one half hours. Reaction product was a viscous liquid at room temperature. It was analyzed by $P^{31}$ NMR. It contained 20% of unreacted DPMP 56% of a mono-inserted product and 23% of the di-inserted product. The $^{13}C$ NMR and FT IR spectra indicate presence of a significant amount of unreacted epoxy groups essential to incorporated the product in any epoxy composition.

Example 7

A 30% by weight mixture of the polyphosphonate used in Example 1 and 70% by weight of a bisphenol A di-epoxy resin (epoxy equivalent 180) were heated at 137° C. for one hour. The reaction product was a solid at room temperature but it was completely soluble in chloroform or acetone. It was analyzed by $P^{31}$ NMR. About 52% of phosphorous remained unchanged, and the rest was reacted with the epoxy Example 8

The epoxy insertion product as described in Example 7 was placed in the oven at 150° C. for one hour and then the temperature was increased to 180° C. over a period of one hour. The resulting cured epoxy composition had a BARKOL hardness of 32 (measured using G1 934-1 meter).

Example 9

The epoxy insertion product as described in Example 7 was dissolved in acetone and mixed with ATH to make a blend containing 62% ATH by weight and 38% of the epoxy composition. Acetone was evaporated under reduced pressure and resulting paste mixed well and cured at 150° C. for one hour followed by a gradual temperature increase to 160° C. over a period of thirty minutes. The resulting cured epoxy composition had a BARKOL hardness of 52.

Example 10

The epoxy insertion product as described in Example 7 dissolved in acetone and combined with 1000 ppm of methylimidazole and 1000 ppm of triphenyl phosphine. Acetone was evaporated under reduced pressure and sample cured at 138° C. for one hour. The resulting cured epoxy composition had a BARKOL hardness of 25.

We claim:

1. An epoxy resin composition comprising an epoxy resin, and, as the curing agent, an epoxy-reactive polyphosphonate having formula (1)

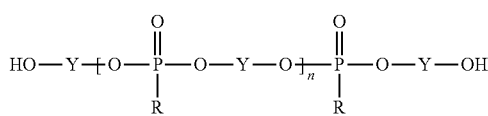

(I)

wherein "Y" is an arylene, "n" ranges from about 2 to about 30 and R is a lower alkyl.

2. A composition as claimed in claim 1 wherein the epoxy resin comprises from about 50% to about 95%, by weight of the total weight of the composition.

3. A composition as claimed in claim 1 wherein the epoxy resin comprises from 65% to 90% by weight of the total weight.

4. A composition as claimed in claim 1 wherein the polyphosphonate comprises from about 5% to 50%, by weight of the total weight of the composition.

5. A composition as claimed in claim 1 wherein the polyphosphonate comprises from 10% to 35% by weight of the total weight.

6. The composition of claim 1 wherein the R is methyl and the arylene is 1,3,-phenylene.

7. The composition of claim 1 wherein the epoxy resin is a bisphenol A di-epoxy resin.

8. The composition of claim 1 further comprising a fiber and/or cloth reinforcing agent.

9. The composition of claim 1 further comprising a colorant.

10. The composition of claim 1 further comprising a release agent.

11. An epoxy resin composition consisting essentially of an epoxy resin, and, as the curing agent, an epoxy-reactive polyphosphonate having formula (1)

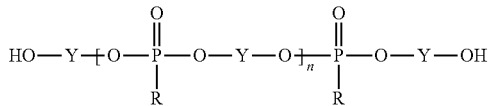

(I)

wherein "Y" is an arylene, "n" ranges from about 2 to about 30 and R is a lower alkyl.

12. A composition as claimed in claim 11 wherein the epoxy resin consists essentially of about 50% to about 95%, by weight, of the total weight of the composition.

13. A composition as claimed in claim 11 wherein the epoxy resin consists essentially of 65% to 90% by weight of the total weight.

14. A composition as claimed in claim 11 wherein the polyphosphonate consists essentially of about 5% to about 50%, by weight, of the total weight of the composition.

15. A composition as claimed in claim 11 wherein the polyphosphonate from 10% to 35% by weight of the total weight.

16. The composition of claim 11 wherein the R is methyl and the arylene is 1,3,-phenylene.

\* \* \* \* \*